(12) United States Patent
Yang

(10) Patent No.: US 9,868,068 B2
(45) Date of Patent: Jan. 16, 2018

(54) INTERACTIVE AMUSEMENT SYSTEM, INTERACTIVE WEARING SYSTEM AND DATA TRANSMISSION CIRCUIT FOR BIOLOGICAL CONTACT

(71) Applicant: Generalplus Technology Inc., Hsinchu (TW)

(72) Inventor: Chih Hsiang Yang, Ho Mei Town, Chang Hua County (TW)

(73) Assignee: GENERALPLUS TECHNOLOGY INC., Hsinchu (TW)

( * ) Notice: Subject to any disclaimer, the term of this patent is extended or adjusted under 35 U.S.C. 154(b) by 430 days.

(21) Appl. No.: 14/600,877

(22) Filed: Jan. 20, 2015

(65) Prior Publication Data

US 2015/0202516 A1    Jul. 23, 2015

(30) Foreign Application Priority Data

Jan. 22, 2014  (TW) .............................. 103102212 A

(51) Int. Cl.

| | |
|---|---|
| *A63F 13/98* | (2014.01) |
| *G06F 3/01* | (2006.01) |
| *A63F 13/212* | (2014.01) |
| *A63F 13/92* | (2014.01) |
| *H04B 13/00* | (2006.01) |
| *G06F 1/16* | (2006.01) |

(52) U.S. Cl.
CPC ............ *A63F 13/98* (2014.09); *A63F 13/212* (2014.09); *A63F 13/92* (2014.09); *G06F 1/163* (2013.01); *G06F 1/1698* (2013.01); *G06F 3/011* (2013.01); *G06F 3/017* (2013.01); *H04B 13/005* (2013.01)

(58) Field of Classification Search
CPC ........ A63F 13/98; A63F 13/212; A63F 13/92; G06F 1/163; G06F 1/1698; G06G 3/011; G06G 3/017; G07C 9/0011; H04B 13/005
See application file for complete search history.

(56) References Cited

FOREIGN PATENT DOCUMENTS

EP          1102215 A2 *  5/2001  ......... G07C 9/00111

* cited by examiner

*Primary Examiner* — Werner Garner
(74) *Attorney, Agent, or Firm* — Muncy, Geissler, Olds & Lowe, P.C.

(57) ABSTRACT

An interactive amusement system, interactive wearing system and a data transmission circuit for biological contact are provided in the present invention. The interactive wearing system includes a first wearing device and a second wearing device. The first and the second wearing devices are includes a contact conductor for respectively contacting with the users. When a first user wears the first wearing device and a second user wears the second wearing device, and the first user touches the second user, a secret message that has been set into the first wearing device by the first user is transmitted to the second wearing device.

27 Claims, 10 Drawing Sheets

INTERACTIVE AMUSEMENT SYSTEM, INTERACTIVE WEARING SYSTEM AND DATA TRANSMISSION CIRCUIT FOR BIOLOGICAL CONTACT

This application claims the benefit of TW Application No. 103102212 filed on Jan. 22, 2014, the content of which is hereby incorporated by reference.

BACKGROUND OF THE INVENTION

Field of Invention

The present invention relates in general to a non-contact ID recognition technology, and more particularly to a system for identifying identity (ID) and an ID card using the same.

Related Art

Human communication technology is a data transmission through a 10.7 MHz weak electric field, which also calls electromagnetic waveguide, for transmitting data through body. The detection method includes electric current detection and electric voltage detection. KDDI Inc has already develops body information measuring sensors. User can put the hand to a pad stick. Through the current of the body, the previously stored information can broadcast on television. It is through the current sensing principle. NTT Inc uses photoelectric sensing method to increase the receiver sensitivity.

Those human communication technologies are adopted in rapid and huge data transmission. Whether it adopts electric current detection or electric voltage detection, they need more complex circuit to perform signal process. However, for the interactive toy or interactive device, there is no need such a rapid or huge data transmission. Thus, when the abovementioned technology is adopted in the interactive toy or interactive device, the cost would be extremely high.

SUMMARY OF THE INVENTION

It is therefore an objective of the present invention to provide an bio-contact interactive wearing system, for transmitting a secret message, information or exchanging electrical business cards.

Another objective of the present invention is to provide a biological contact interactive amusement system, for play game through a biological contact to increase an interactivity of the game.

The other objective of the present invention is to provide a data transmission circuit for biological contact, to transmit data by the biological contact through a low frequency resonant and electrical field transmission.

In order to achieve the abovementioned first object of the present invention and other object of the present invention, a biological contact interactive wearing system is provided. The biological contact interactive wearing system includes a first bio-contact wearing device and a second bio-contact wearing device. The first bio-contact wearing device includes a first fastener, a first contact conductor, a first signal transmitting circuit and a first storage device. The second bio-contact wearing device includes a second fastener, a second contact conductor, a second signal receiving circuit and a second display device. The first fastener is for fastening the first bio-contact wearing device to a first user. The first contact conductor contacts the first user when the first user wears the first bio-contact wearing device. The first signal transmitting circuit is coupled to the first contact conductor. The first storage device is coupled to the first signal transmitting circuit, for storing a transmitting message. The second fastener is for fastening the second bio-contact wearing device to a second user. The second contact conductor contacts the second user when the second user wears the second bio-contact wearing device. The second signal receiving circuit is coupled to the second contact conductor. The second display device is coupled to the second signal receiving circuit.

When the first user touch the second user, the first signal transmitting circuit modulates the transmitting message to a modulation signal, and transmits the modulation signal to the first contact conductor to transmit the modulation signal to the second conductor through a skin of the first user and a skin of the second user. The second signal receiving circuit receives the modulation signal from the second contact conductor to perform the demodulation to obtain the transmitting message. The second display displays the transmitting message when the second user operates the second bio-contact wearing device.

In biological contact interactive wearing system according to a preferred embodiment of the present invention, the first signal transmitting circuit includes a first resonant circuit, a first pulse width modulation circuit and a first control circuit. The first resonant circuit includes a first terminal, a second terminal and a resonant terminal, wherein the resonant terminal of the first resonant circuit is coupled to the first contact conductor. The first pulse width modulation circuit is coupled to the first terminal of the first resonant circuit, for outputting a first pulse width modulation signal to the first terminal of the first resonant circuit. The first control circuit is coupled to the first storage device and the first pulse width modulation circuit, for driving the first pulse width modulation circuit according to the transmitting message, to generate the first pulse width modulation signal. In a preferred embodiment, the first resonant circuit includes a resonant inductor and a resonant capacitor. The first terminal of the resonant inductor is coupled to the first terminal of the first resonant circuit. The first terminal of the resonant capacitor is coupled to the second terminal of the resonant inductor and the first contact conductor. In a preferred embodiment, first pulse width modulation circuit is a half bridge converter, and the half bridge converter includes a first upper switch and a first lower switch. The control terminal of the first upper switch is coupled to the first control circuit, the first terminal of the first upper switch is coupled to a power voltage, and the second terminal of the first upper switch is coupled to the first terminal of the resonant inductor. The control terminal of the first lower switch is coupled to the first control circuit, the first terminal of the first lower switch is coupled to the first terminal of the resonant inductor, and the second terminal of the first lower switch is coupled to a common voltage. The second terminal of the resonant capacitor is coupled to the common voltage.

In addition, in a preferred embodiment, the first pulse width modulation circuit is a full bridge converter, and the full bridge converter includes a first upper switch, a first lower switch, a second upper switch and a second lower switch. The control terminal of the first upper switch is coupled to the first control circuit, the first terminal of the first upper switch is coupled to a power voltage, and the second terminal of the first upper switch is coupled to the first terminal of the resonant inductor. The control terminal of the first lower switch is coupled to the first control circuit, the first terminal of the first lower switch is coupled to the first terminal of the resonant inductor, and the second terminal of the first lower switch is coupled to a common voltage. The control terminal of the second upper switch is coupled to the first control circuit, the first terminal of the second upper switch is coupled to the power voltage, and the second terminal of the second upper switch is coupled to the second terminal of the resonant capacitor. The control terminal of the second lower switch is coupled to the first control circuit, the first terminal of the second lower switch is coupled to the second terminal of the resonant capacitor, and the second terminal of the first lower switch is coupled to the common voltage.

In a preferred embodiment, when the first logic of the transmitting message is transmitted by the first signal transmitting circuit, the first control circuit controls the first pulse width modulation circuit to output pulses to the first resonant circuit for a preset period, afterward, to stop outputting the pulses for the preset period. When a second logic of the transmitting message is transmitted by the first signal transmitting circuit, the first control circuit controls the first pulse width modulation circuit to stop outputting the pulses to the first resonant circuit for the preset period, afterward, to output the pulses for the preset period. In another preferred embodiment, when the first logic of the transmitting message is transmitted by the first signal transmitting circuit, the first control circuit controls the first pulse width modulation circuit to output pulses to the first resonant circuit for a first preset period. When the second logic of the transmitting message is transmitted by the first signal transmitting circuit, the first control circuit controls the first pulse width modulation circuit to output pulses to the first resonant circuit for a second preset period. The first preset period is not equal to the second preset period, and between Ith bit of the transmitting message and (I+1)th bit of the transmitting message, the first control circuit controls the first pulse width modulation circuit to stop outputting pulses to the first resonant circuit for a third preset period, wherein I is a natural number.

A biological contact interactive amusement system is provided in the present invention. The biological contact interactive amusement system includes a first amusement device and a second amusement device. The first amusement device includes a first control interface, a first signal transmitting circuit, a first contact conductor and a first signal receiving circuit. The first control interface includes comprising N options. The first signal transmitting circuit is coupled to the first control interface, wherein the first signal transmitting circuit outputs $K^{th}$ signal when the $K^{th}$ option is selected. The first contact conductor is coupled to the first signal transmitting circuit, for receiving a signal outputted from the first signal transmitting circuit. The first signal receiving circuit is coupled to the first contact conductor. The second amusement device includes a second control interface, a second signal transmitting circuit, a second contact conductor and a second signal receiving circuit. The second control interface includes N options. The second signal transmitting circuit is coupled to the first control interface, wherein the first signal transmitting circuit outputs $M^{th}$ signal when the $M^{th}$ options is selected. The second contact conductor is coupled to the second signal transmitting circuit, for receiving a signal outputted from the second signal transmitting circuit. The second signal receiving circuit is coupled to the second contact conductor. When the $I^{th}$ option of the first control interface is selected and the $J^{th}$ option of the second control interface is selected, and there is at least a biological organism between the first contact conductor and second contact conductor, the $I^{th}$ signal outputted from the first control interface is transmitted to the second contact conductor, and the $J^{th}$ signal outputted from the second control interface is transmitted to the first contact conductor. The first signal receiving circuit receives the $J^{th}$ signal to demodulate the $J^{th}$ signal to obtain a data of $J^{th}$ option, and according to a preset rule, the data of the $J^{th}$ option and a data of the $I^{th}$ option, a result of a game of the first amusement device is determined, and the first amusement device outputs the result of the game of the first amusement device. The second signal receiving circuit receives the $I^{th}$ signal to demodulate the $I^{th}$ signal to obtain the data of the $I^{th}$ option, and according to the preset rule, the data of $J^{th}$ option and the data of $I^{th}$ option, a result of the game of the second amusement device is determined, and the second amusement device outputs the result of the game of the second amusement device.

A data transmission circuit for biological contact is provided. The data transmission circuit for biological contact includes a contact conductor, a resonant circuit, a pulse width modulation circuit and a control circuit. The resonant terminal of the resonant circuit is coupled to the contact conductor. The pulse width modulation circuit is coupled to the first terminal of the resonant circuit, for outputting a pulse width modulation signal to the first terminal of the resonant circuit. The control circuit is coupled to the pulse width modulation circuit, for driving the pulse width modulation circuit to generate the pulse width modulation signal. When the data transmission circuit for biological contact performs data transmission, the control circuit controls the pulse width modulation circuit to output the pulse width modulation signal to the resonant circuit such that the resonant circuit generates a resonant sinusoidal wave to the contact conductor, and the control circuit controls the output period and its time interval of the resonant sinusoidal wave according to a logic of a data to be transmitted. When a biological organism contacts the contact conductor, the resonant sinusoidal wave transmits to an external signal receiving circuit through the skin of the biological organism, the signal receiving circuit determines the logic of the transmitted data according to an envelope of the resonant sinusoidal wave.

Since the contact is an important way to interact between people, the present invention provides the interaction device to perform game, to transmit message or to exchange business cards through the contact by people, such that the interactivity between people or between people and game device can be increased. Further, in the aspect of data transmission, the resonant sinusoidal wave is outputted on the pad. When there is at least a biological organism between two pads, the resonant sinusoidal wave would transmit by the skin of the biological organism.

Further scope of the applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention.

DETAILED DESCRIPTION OF THE INVENTION

The present invention will be apparent from the following detailed description, which proceeds with reference to the accompanying drawings, wherein the same references relate to the same elements.

Figure 1:
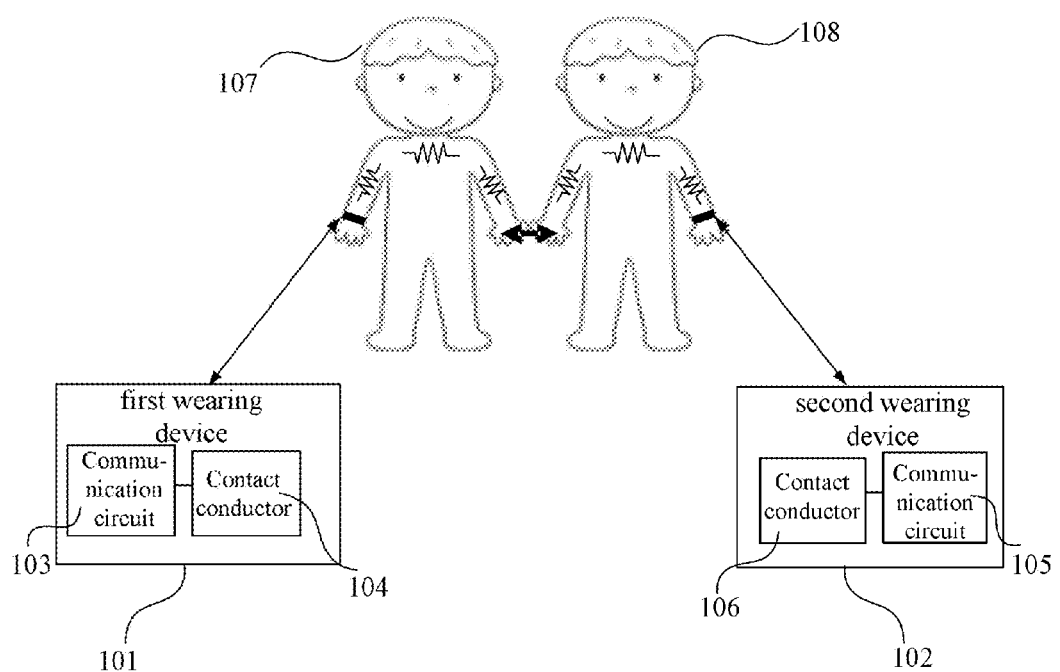
FIG. 1 illustrates a schematic depicting the biological contact interactive wearing system according to the conventional art.
Figure 2:
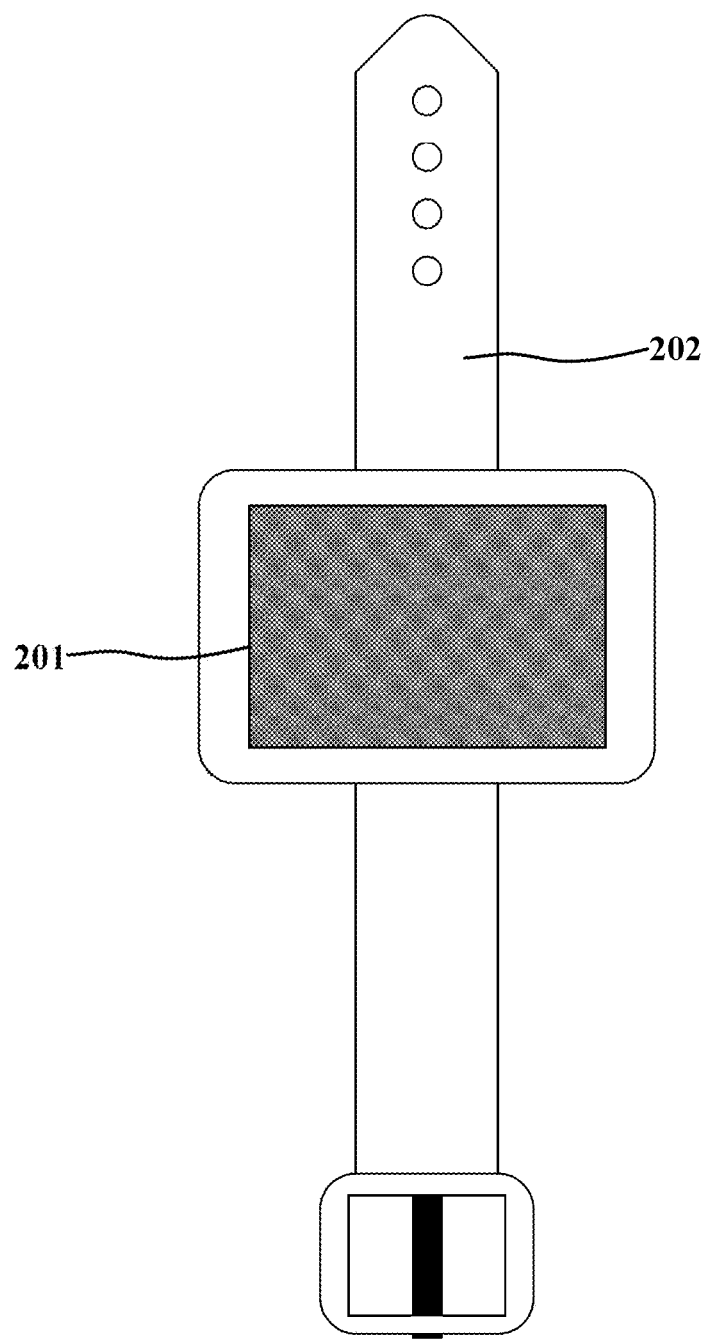
FIG. 2 illustrates a schematic depicting the first bio-contact wearing device 101 and the second bio-contact wearing device 102 according to a preferred embodiment of the present invention.

FIG. 1 illustrates a schematic depicting the biological contact interactive wearing system according to the conventional art. Referring to FIG. 1, the biological contact interactive wearing system includes a first wearing device 101 and a second wearing device 102. The first wearing device 101 includes a communication circuit 103 and a contact conductor 104. The second wearing device 102 also includes a communication circuit 105 and a contact conductor 106. FIG. 2 illustrates a schematic depicting the first bio-contact wearing device 101 and the second bio-contact wearing device 102 according to a preferred embodiment of the present invention. Referring to FIG. 2, in this embodiment, the smart watch is taken as an example of the first wearing device 101 or the second wearing device 102. The smart watch includes a fastener 202, such as strap. The contact portion between the smart watch and the skin of the wrist is disposed a contact conductor 201.

Referring to FIG. 1, it is assumed that the first wearing device 101 stores a business card data of the first user 107, and the second wearing device 102 stores a business card data of the second user 108. When the first user 107 and the second user 108 shake hands, the communication circuit 103 modulates the business card data of the first user 107, afterward, the modulated data is transmitted to the communication circuit 105 through the contact conductor 104, the first user's skin, the second user's skin and then the contact conductor 106. After the demodulation, the communication circuit 105 obtains the business card data of the first user 107. Similarly, the communication circuit 105 modulates the business card data of the second user 108, afterward, the modulated data is transmitted to the communication circuit 103 through the contact conductor 106, the second user's skin, the first user's skin and then the contact conductor 104. After the demodulation, the communication circuit 103 obtains the business card data of the second user 108. Through the abovementioned interaction, the first user 107 and the second user 108 finish to exchange their business cards. And then, the business card data can be respectively stored in their wearing device or displayed at their monitor of their wearing device.

In the embodiment, beside the business card, the transmission data also can be other information. For example, if the first user 107 has a message to be transmitted to the second user 108, wherein the message does not want to be aware of other people, the first user 107 can operates the first wearing device 101 to input the secret message. Afterward, the first user 107 touches the second user 108. At this time, the communication circuit 103 modulates the secret message to a modulation signal, and then the modulation signal is transmitted to the communication circuit 105 through the contact conductor 104, the first user's skin, the second user's skin and then the contact conductor 106. After the demodulation, the communication circuit 105 obtains the secret message of the first user 107. Afterward, the second user can operates the second wearing device 102 to watch the secret message.

Furthermore, in the abovementioned embodiment, the watch or the wrist band is served as an example. However, people having ordinary skill in the art should know that the necklace, the glasses also can be implemented as the abovementioned embodiment. Any things which wear to touch the body can be served as the wearing device of the embodiment. Thus, the present invention is not limited thereto.

Figure 3:
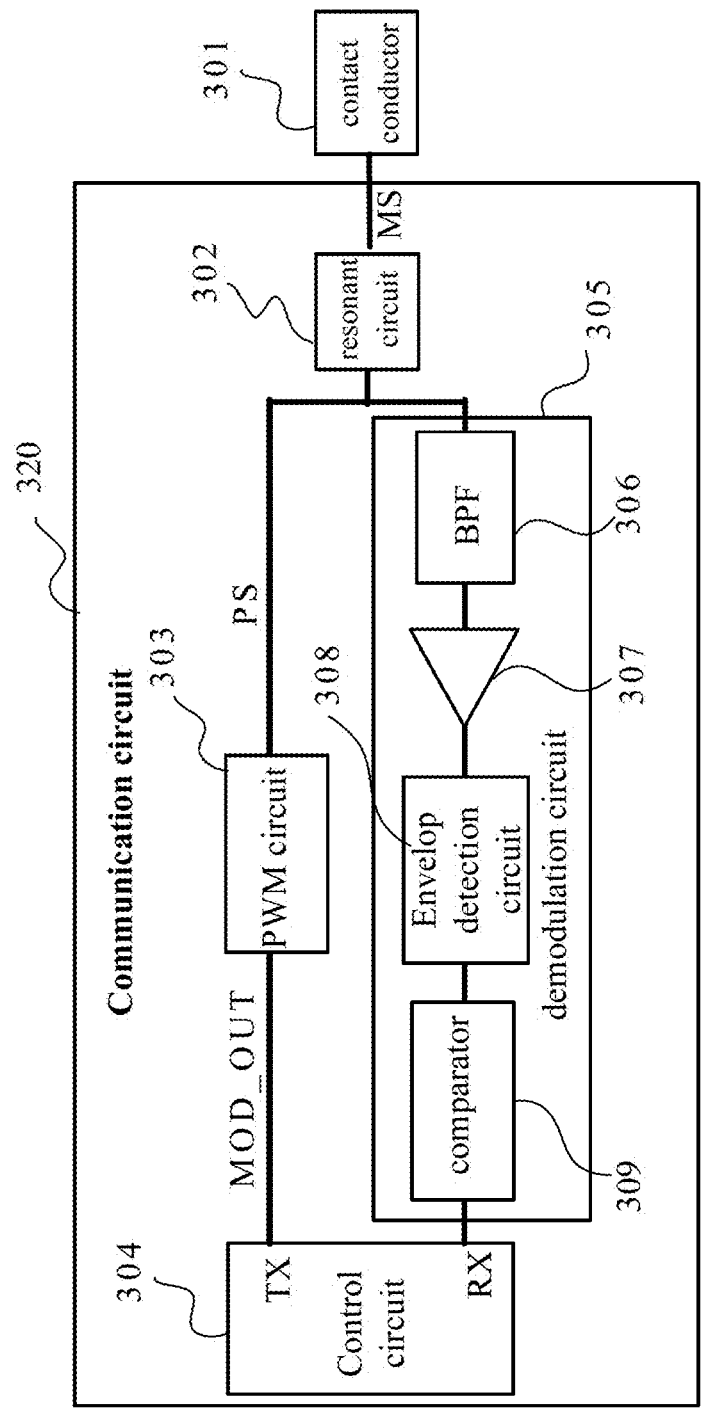
FIG. 3 illustrates a circuit block diagram depicting the first bio-contact wearing device 101 and the second bio-contact wearing device 102 according to a preferred embodiment of the present invention.

FIG. 3 illustrates a circuit block diagram depicting the first bio-contact wearing device 101 and the second bio-contact wearing device 102 according to a preferred embodiment of the present invention. Referring to FIG. 3, the circuit of the wearing device at least includes a contact conductor 301 and a communication 320. The communication circuit includes a signal transmitting circuit and a signal receiving circuit, wherein the signal transmitting circuit includes a resonant circuit 302, a pulse width modulation (PWM) circuit 303 and a control circuit 304. The signal receiving circuit includes the resonant circuit 302, a signal demodulation circuit 305 and the control circuit 304. The signal transmitting circuit converts the message to be transmitted to a modulation signal MS, and then transmits the modulation signal MS to the contact conductor 301. Next, the modulation signal MS is transmitted through user's skin.

The signal receiving circuit of the communication circuit 320 is used for demodulating the signal received from the contact conductor 301 to obtain the message of the other wearing device. In the embodiment of the present invention, the signal is not transmitted by the electric field, but the signal is transmitted by diffraction method through the surface of the body. This method also calls electrostatic coupling method. In this embodiment, the resonant circuit 302 receives the PWM signal PS outputted from the PWM circuit 303, to perform the resonant to generate a strong electric field. When user contacts the contact conductor 301, the signal resonated by the resonant circuit 302 is transmitted by the contact of the biological organism through the electrostatic coupling method.

Since in the data transmitted of the present embodiment, the resonant method is used for data transmission, the frequency of the circuit can be set to a lower frequency, such as 100 KHz~500 KHz. Moreover, the lower resonant frequency (100 KHz~500 KHz) is adopted in the present embodiment and the signal is transmitted on the surface of the biological organism, the high frequency RF circuit is not required to implement the circuit of the embodiment. In addition, the signal receiving and the signal transmitting can uses the same contact conductor 301.

Figure 4:
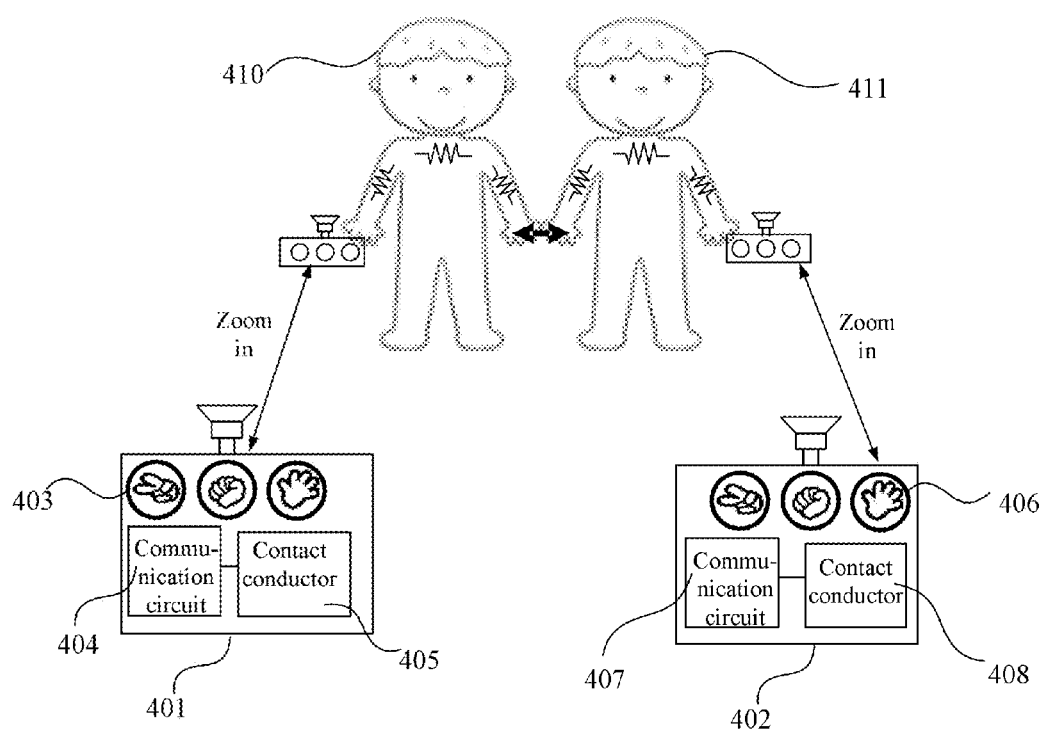
FIG. 4 illustrates a schematic depicting the biological contact interactive amusement system according to a preferred embodiment of the present invention.

The abovementioned biological contact wearing system uses the data transmission to serve as an exemplary example, but the present invention also can be used for playing game by biological contact. FIG. 4 illustrates a schematic depicting the biological contact interactive amusement system according to a preferred embodiment of the present invention. Referring to FIG. 4, the biological contact interactive amusement system includes a first amusement device 401 and a second amusement device 402. The first amusement device 401 includes a control interface 403, a communication circuit 404 and a contact conductor 405. The second amusement device 402 also includes a control interface 406, a communication circuit 407 and a contact conductor 408. In the present embodiment, the biological contact interactive amusement system uses the roshambo game consoles to serve as the exemplary example. Thus, the control interfaces 403 and 406 of the amusement devices 401 and 402 are respectively includes the options of rock, paper, and scissors.

Referring to FIG. 4, it is assumed that the user 410 of the first amusement device 401 chooses the "scissors" through the control interface 403, and the user 411 of the second amusement device 402 chooses "rock" through the control interface 406. When the user 410 and the user 411 shake hands or contact each other's bodies, the communication circuit of the first amusement device 401 modulated the data code "scissors", afterward, the modulated data is transmitted to the communication circuit 407 through the contact conductor 405, the user's skin 410, the user's skin 411 and then the contact conductor 408. The communication circuit 407 demodulated the modulated data to obtain the data code "scissors".

Similarly, the communication circuit 407 of the second amusement device 402 modulated the data code "rock" which is selected by the second user. Afterward, the modulated data is transmitted to the communication circuit 404 through the contact conductor 408, the user's skin 411, the user's skin 410 and then the contact conductor 405. The communication circuit 404 demodulated the modulated data to obtain the data code "rock". Next, after the first amusement device 401 receives the data code "rock", it determines the result of the game according to the received data code. In this embodiment, the first amusement device 401 may output "lose" voice thorough its speaker. Similarly, when the second amusement device 402 receives the data code "scissors", it determines the result of the game according to the received data. In this embodiment, the second amusement device 402 may output "win" voice thorough its speaker.

In this embodiment, if user 410 and the user 411 select the same option, the amusement devices 401 and 402 would play "draw" voice at the same time. Further, in the present embodiment, the amusement device 401 and 402 adopt the speaker to play the results of the game. In another preferred embodiment, they may show the results of the game by the display or another output devices. Although, the present embodiment adopts "roshambo" to serve as an exemplary example, wherein the control interfaces 403 and 406 only has three options, designer may design four options game, such as "rod tigers chicken bug". Thus, people having ordinary skill in the art should know that the number of the options is a selective design. Thus, the present invention is not limited thereto.

The implementation of the communication circuits 404 and 407 of the amusement devices 401 and 402 can adopt the circuit in FIG. 3, it includes the signal transmitting circuit and the signal receiving circuit. The detail description is omitted. In order that people has ordinary skill in the art implements the present invention, the protocol of the signal transmitting circuit and the signal receiving circuit is described. However, the present invention is not limited thereto.

Figure 5:
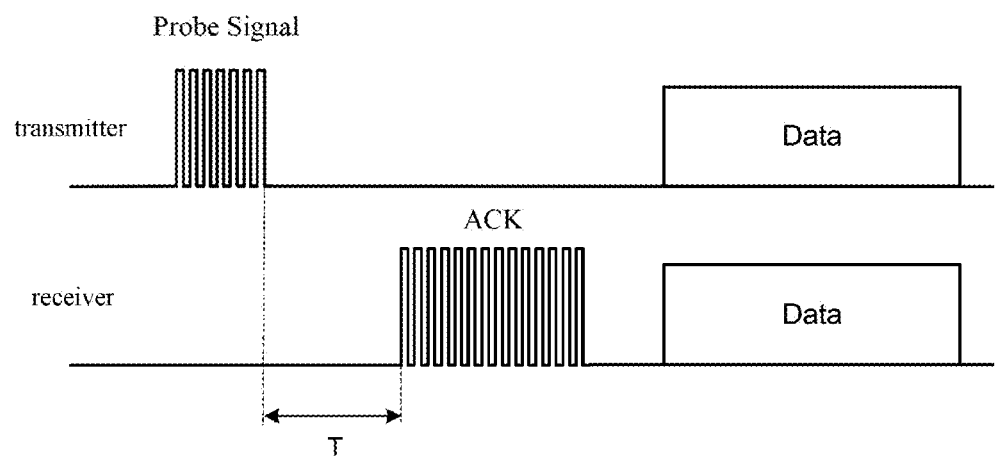
FIG. 5 illustrates a waveform diagram depicting the operational waveforms of the first bio-contact wearing device 101, the second bio-contact wearing device 102, the first amusement device 401 and the second amusement device 402 according to a preferred embodiment of the present invention.

FIG. 5 illustrates a waveform diagram depicting the operational waveforms of the first bio-contact wearing device 101, the second bio-contact wearing device 102, the first amusement device 401 and the second amusement device 402 according to a preferred embodiment of the present invention. In the present embodiment, it is assumed that the first wearing device 101 is the transmitter, and the second wearing device 102 is the receiver. Referring to FIG. 5, when the data is transmitted, the control circuit 304 of the first wearing device 101 controls the PWM circuit 303 to drive the resonant circuit 302 to generate the probe signal. Next, the first wearing device 101 waits for receiving the acknowledge (ACK) signal. In the period T, if the first wearing device 101 receives the ACK signal, the synchronization is complete. In general, the probe signal and the ACK signal respective have different lengths such that the device can distinguish two signals. When the synchronization is complete, the first wearing device 101 performs the data transmission, and the second wearing device 102 also start to receive data.

Figure 6A:
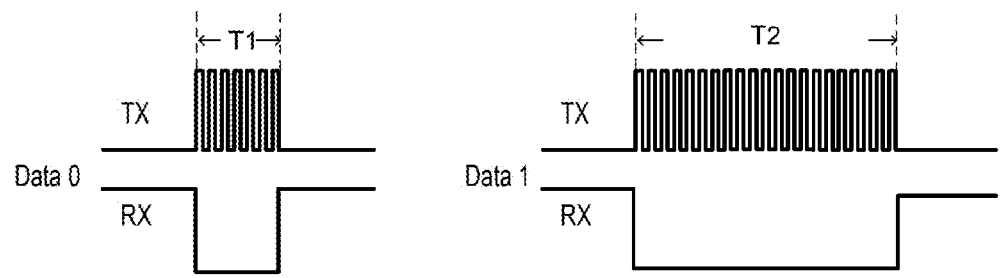
FIG. 6A illustrates a waveform diagram depicting the data transmission by pulse width modulation according to a preferred embodiment of the present invention.

The abovementioned data transmission may adopt PWM technology, as shown in FIG. 6A, FIG. 6A illustrates a waveform diagram depicting the data transmission by pulse width modulation according to a preferred embodiment of the present invention. Referring to FIG. 6A, the pulse maintenance time is used to represent the logic data. When the logic data is "0", the control circuit 304 controls the PWM circuit 303 to output the pulse to the resonant circuit for a preset period T1. When the logic data is "1", the control circuit 304 controls the PWM circuit 303 to output the pulse to the resonant circuit for a preset period T2. In this embodiment, the preset period T1 is shorter than the present period T2. However, people having ordinary skill in the art should know that the data can be successfully identified when the pulse maintenance time of the logic "0" is different from the pulse maintenance time of the logic "1". Thus, the present invention is not limited thereto. Moreover, between the adjacent bits, the control circuit 304 controls the PWM circuit 303 to stop outputting the pulse to the resonant circuit for a preset time T3 to distinguish the different bit data.

Figure 6B:
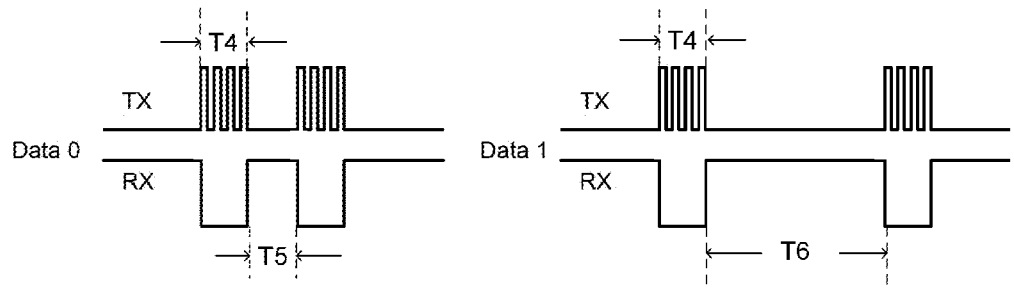
FIG. 6B illustrates a waveform diagram depicting the data transmission by pulse width modulation according to a preferred embodiment of the present invention.

In the present embodiment, the data transmission also can adopts pulse frequency modulation (PFM) technology, as shown in FIG. 6B, FIG. 6B illustrates a waveform diagram depicting the data transmission by pulse frequency modulation according to a preferred embodiment of the present invention. Referring to FIG. 6B, the digital data "0" or "1" is transmitted to utilize the time between the two groups of pulses. When the transmission data is logic "0", the control circuit 304 controls the PWM circuit 303 to output the pulse to the resonant circuit 302 for a preset period T4. Afterward, the control circuit 303 controls the PWM circuit 303 to stop outputting the pulse for a preset period T5. When the transmission data is logic "1", the control circuit 304 controls the PWM circuit 303 to output the pulses to the resonant circuit 302 for the preset period T4. Afterward, the control circuit 304 controls the PWM circuit 303 to stop outputting the pulses for a preset period T6, wherein the preset period T5 is not equal to the preset period T6. According to FIG. 6A and FIG. 6B, the receiver Rx can demodulate the modulated signal to obtain the original transmission data through a filter to detect the pulse maintenance time.

Figure 7A:
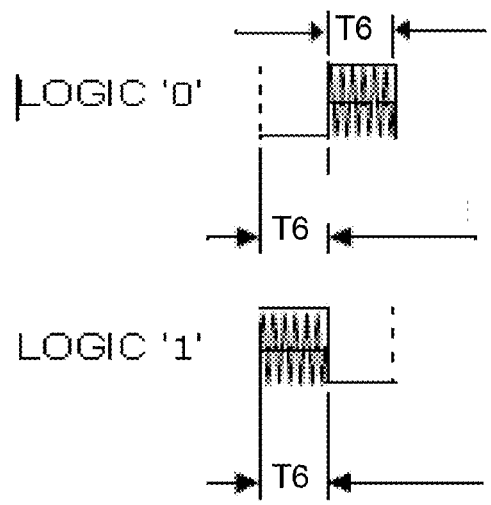
FIG. 7A illustrates a waveform diagram depicting the data transmission by Manchester encoding according to a preferred embodiment of the present invention.
Figure 7B:
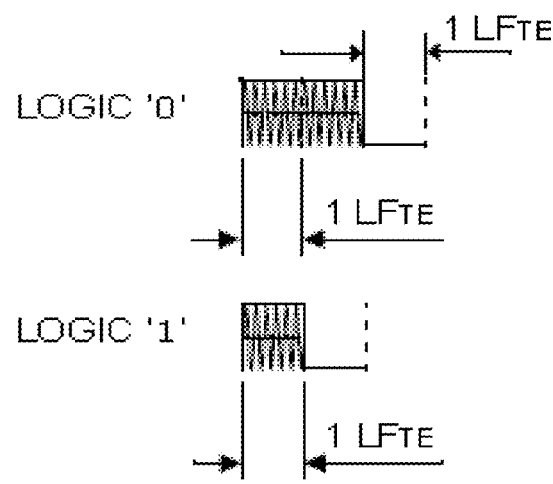
FIG. 7B illustrates a waveform diagram depicting the data transmission by pulse phase modulation according to a preferred embodiment of the present invention.

In addition, the data transmission can also adopt the Manchester data encoding technology, as shown in FIG. 7A, FIG. 7A illustrates a waveform diagram depicting the data transmission by Manchester encoding according to a preferred embodiment of the present invention. Referring to FIG. 7A, when the transmission data is logic "0", the control circuit 304 controls the PWM circuit to output the pulses to the resonant circuit for a preset period T7. Afterward, the control circuit 304 controls the PWM circuit 303 to stop outputting the pulses for the preset period T7. When the transmission data is logic "1", the control circuit 304 controls the PWM circuit to stop outputting the pulses to the resonant circuit for the preset period T7. Afterward, the control circuit 304 controls the PWM circuit 303 to output the pulses for the preset period T7. In addition, the data transmission in the present embodiment also can adopts the pulse phase modulation technology, as shown in FIG. 7B, FIG. 7B illustrates a waveform diagram depicting the data transmission by pulse phase modulation according to a preferred embodiment of the present invention. Thus, the present invention is not limited thereto.

If the abovementioned first wearing device 101 and the second wearing device is to perform the data exchange, such as exchanging business cards, when the first wearing device 101 finishes the data transmission, the first wearing device 101 waits for the probe signal. When the first wearing device 101 receives the probe signal from the second wearing device 102, the first wearing device transmits the ACK signal to the second device 102 to start to receive data. Thus, the data exchange is performed.

In the present embodiment, the data transmission includes an error detection, that is, the transmitter would transmits the error detection code to the receiver when the affect data transmission is finished, such that the receiver can check the correctness of the received data. Otherwise, before the data transmission, the transmitter transmits the data length of the affected digital data to be transmitted to the receiver to serve as the error detection. Thus, the present invention is not limited thereto.

In the abovementioned embodiment, one way communication between the first wearing device 101 and the second wearing device 102 is served as an example. However, the present invention can be applied to a broadcast data, that is, to transmit data to a plurality of wearing devices or a plurality of amusement devices. Thus, the communication method of the present invention is not limited thereto. In addition, in the application of the broadcast data, before the transmission of the information, the confirmation method can adopts the abovementioned method, to wait the ACK signal returned from the receivers to transmit the data. Or, the transmitter may directly transmit the data without the returned ACK signal.

Next, in order that people having ordinary skill in the art implements the present invention, the detail circuit is provided for describing the circuit block diagram in FIG. 3. However, the present invention is not limited to the circuit provided hereinafter.

Figure 8:
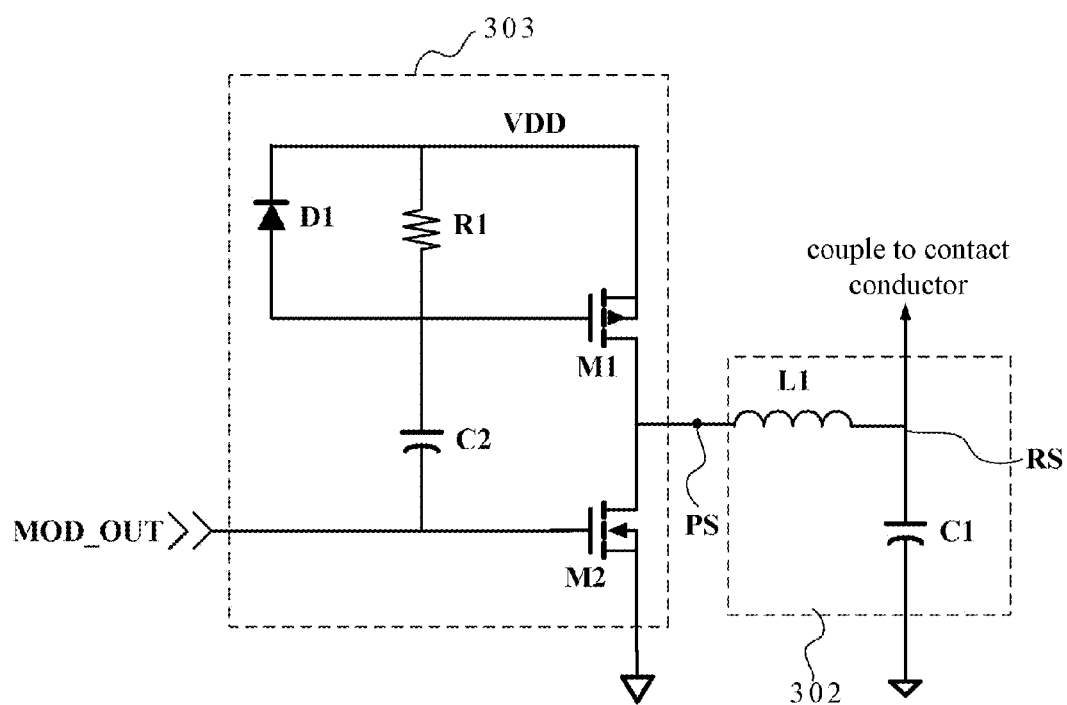
FIG. 8 illustrates a circuit diagram depicting the pulse width modulation circuit 303 and the resonant circuit 302 according to a preferred embodiment of the present invention.

FIG. 8 illustrates a circuit diagram depicting the pulse width modulation circuit 303 and the resonant circuit 302 according to a preferred embodiment of the present invention. Referring to FIG. 8, the PWM circuit 303 includes an upper switch M1, a lower switch M2, a resistor R1, a capacitor C2 and a diode D1. The resonant circuit includes a resonant inductor L1 and a resonant capacitor C1. The coupling relationship of the abovementioned elements is as shown in FIG. 8. The gate terminal of the lower switch M2 is coupled to the control circuit 304 and receives the switch control signal MOD_OUT. In this embodiment, the upper switch M1 is implemented by a P-type MOSFET, and the lower switch M2 is implemented by an N type MOSFET.

When the switch control signal MOD_OUT is logic high voltage VH, the lower switch M2 is turned on, and the upper switch M1 is turned off cause the capacitor C1 is charged to VDD+VH. The voltage of the capacitor C1 (VDD+VH) would rapidly discharge to VDD+VD through the diode D1, wherein the VD is turn on voltage of the diode D1. When the switch control signal MOD_OUT is logic low voltage, the lower switch M2 is turned off, and the upper switch is turned on cause the voltage of the capacitor C1 is changed to VDD−VH. The voltage of the capacitor would be charged through the resistor R1. The inductor L1 and the capacitor C2 are resonant according to the PWM signal PS generated by the upper switch M1 and the lower switch M2 to generate resonant sinusoidal wave MS such that a stronger electric field is generated.

Figure 9:
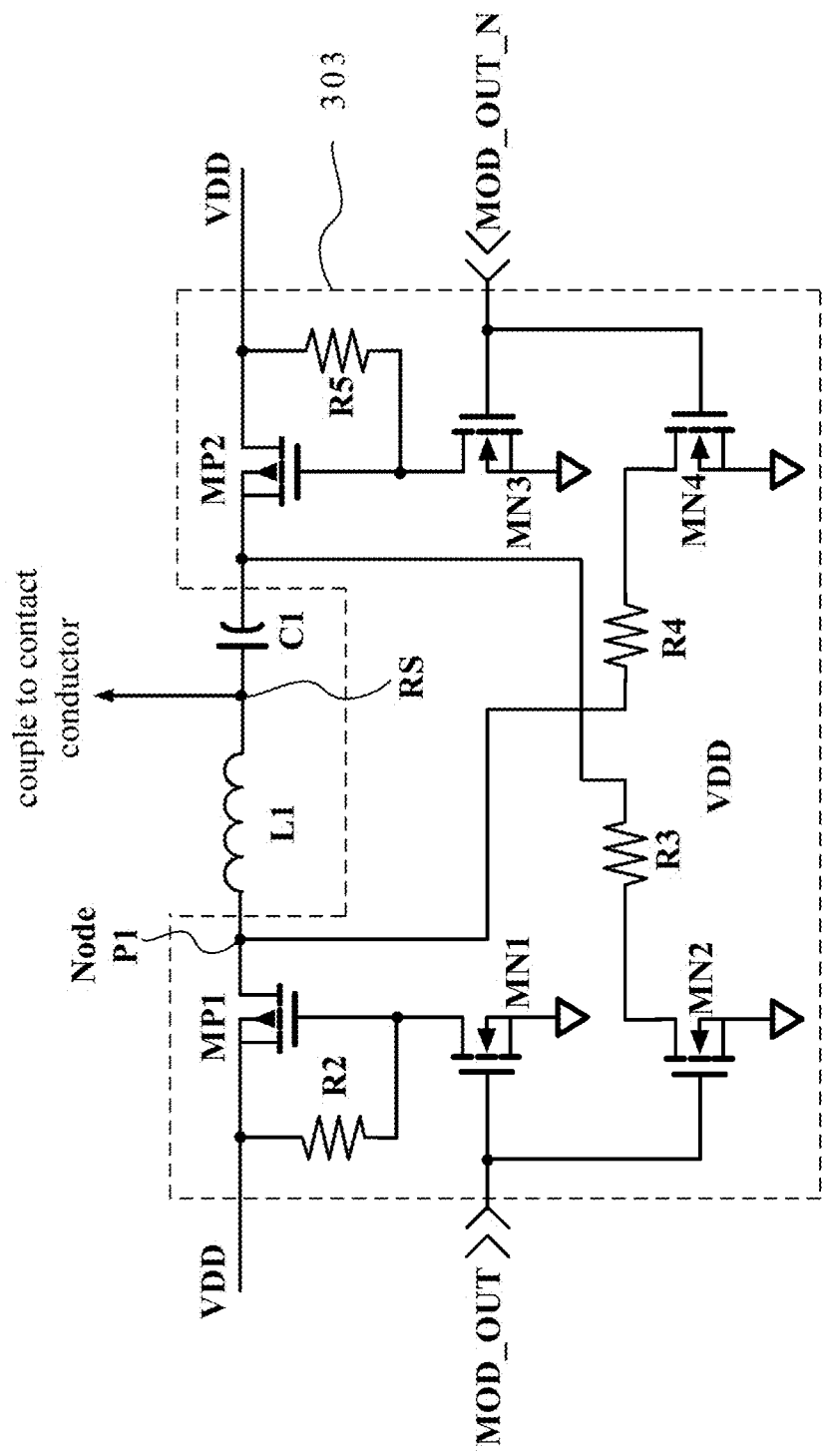
FIG. 9 illustrates a circuit diagram depicting the pulse width modulation circuit 303 and the resonant circuit 302 according to a preferred embodiment of the present invention.

FIG. 9 illustrates a circuit diagram depicting the pulse width modulation circuit 303 and the resonant circuit 302 according to a preferred embodiment of the present invention. Referring to FIG. 9, the PWM circuit 303 includes a first upper switch MP1, a first lower switch MN4, a second upper switch MP2, a second lower switch MN2, resistors R2, R3, R4 and R5 and two MOSFET MN1 and MN3 for driving the first upper switch MP1 and the second upper switch MP2. The coupling relationship of the abovementioned elements is as shown in FIG. 9.

The difference between the method for driving the resonant circuit 302 in FIG. 9 and the method in FIG. 8 is that the circuit in FIG. 9 is full bridge and the circuit in FIG. 8 is half bridge. When the switch control signal MOD_OUT is logic high voltage VH, the switch control signal MOD_OUT_N is logic low voltage. At this time, the lower switch MN2 is turned on, and the lower switch MN4 is turned off. The upper switch MP1 is turned on cause the N-type MOSFET MN1 is turned on. The upper switch MP2 is turned off cause the N-type MOSFET MN3 is turned off. Meanwhile, the current flows through the upper switch MP1, the inductor L1, the capacitor C1, the resistor R3 and the lower switch MN2 to form a loop. When the switch control signal MOD_OUT is logic low voltage VH, the switch control signal MOD_OUT_N is logic high voltage. At this time, the lower switch MN2 is turned off, and the lower switch MN4 is turned on. The upper switch MP1 is turned off cause the N-type MOSFET MN1 is turned off, and the upper switch MP2 is turned on cause the N-type MOSFET MN3 is turned on. Meanwhile, the current flows through the upper switch MP2, the capacitor C1, the inductor L1, the resistor R4 and the lower switch MN4 to form a loop. The inductor L1 and the capacitor C1 are resonant according to the PWM signal generated by the PWM circuit in FIG. 9 to generate the resonant sinusoidal wave MS such that a stronger electric field is generated.

Figure 10:
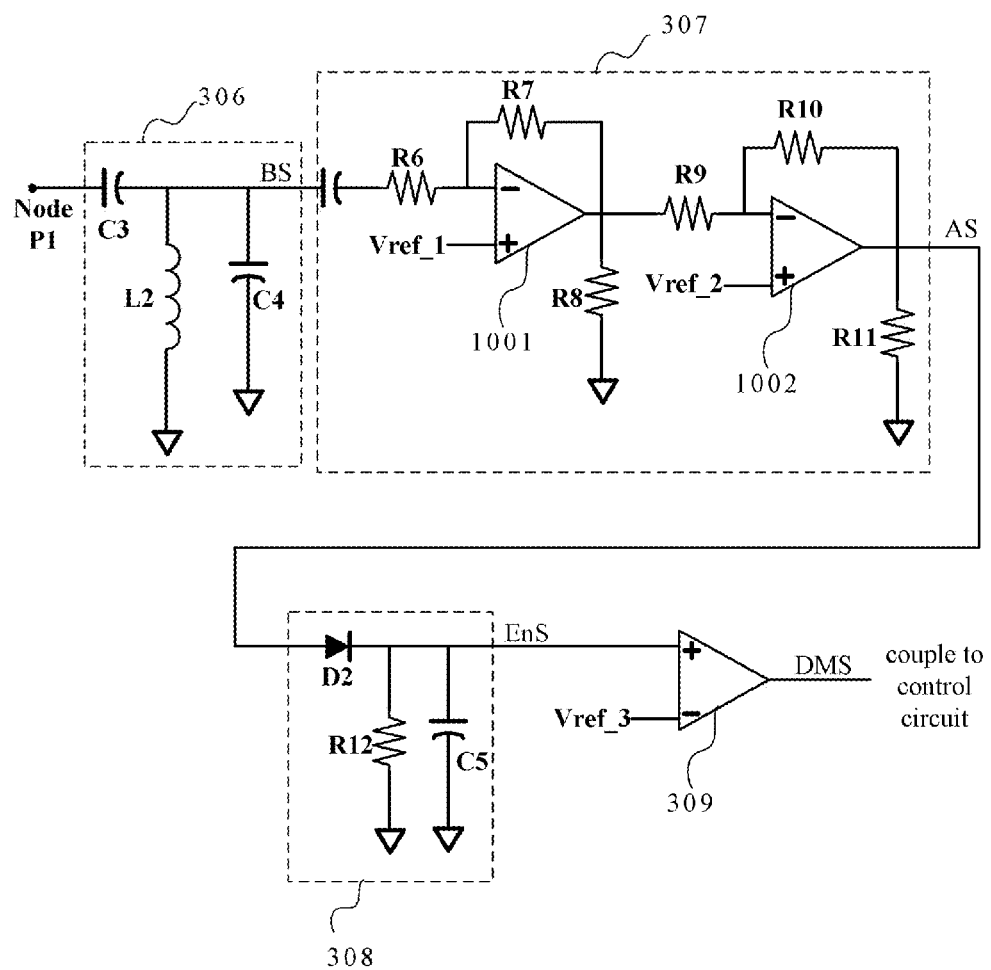
FIG. 10 illustrates a circuit diagram depicting the signal receiving and demodulation circuit 305 according to a preferred embodiment of the present invention.

FIG. 10 illustrates a circuit diagram depicting the signal receiving and demodulation circuit 305 according to a preferred embodiment of the present invention. The signal demodulation circuit 305 includes a band-pass filter 306, an amplifying circuit 307, an envelope detection circuit 308 and a comparator 309, wherein the band-pass filter 306 receives the modulation signal MS from the contact conductor 301 through the resonant inductor L1. The band-pass filter 306 includes capacitors C3 and C4 and an inductor L2 for performing a band-pass filtering to the received modulated signal MS to obtain the band-pass filtered signal BS. The amplifying circuit 307 receives the band-pass filtered signal BS to amplify it to output an amplified signal AS. In the present embodiment, the amplifying circuit 307 is implemented by a two stage amplifier, which includes amplifiers 1001, 1002 and resistors R6, R7, R8, R9, R10 and R11.

The envelope detection circuit 308 detects the envelope of the amplified signal AS to obtain the envelope signal EnS. The envelope detection circuit 308 includes a diode D2, a resistor R12 and a capacitor C5. Finally, the first input terminal of the comparator 309 receives the envelope signal EnS, the second input terminal of the comparator 309 receives a reference voltage Vref_3. The comparator 309 compares the envelope signal EnS with the reference voltage Vref_3 to output a demodulated signal DMS to the control circuit 304. The control circuit 304 receives the demodulated signal DMS, to obtain the digital data from the demodulated signal DMS.

Figure 11A:
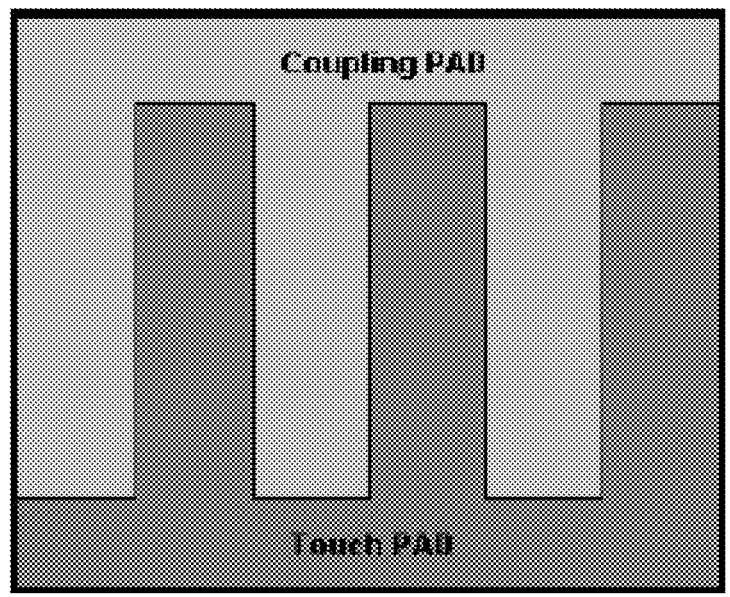
FIG. 11A illustrates a diagram depicting the contact conductor according to a preferred embodiment of the present invention.
Figure 11B:
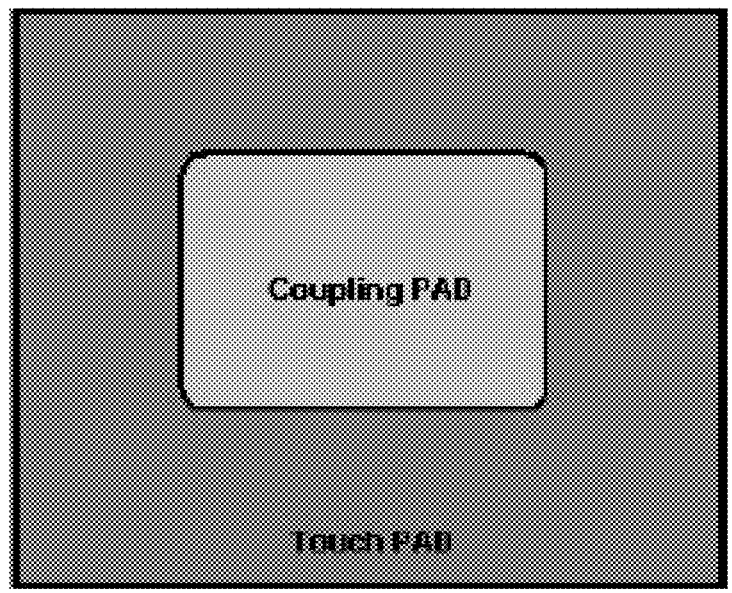
FIG. 11B illustrates a diagram depicting the contact conductor according to another preferred embodiment of the present invention.

FIG. 11A illustrates a diagram depicting the contact conductor according to a preferred embodiment of the present invention. Referring to FIG. 11A, the contact conductor includes a coupling pad 1101 and a touch pad 1102. The coupling pad 1102 is coupled to the resonant circuit. When the user contacts the coupling pad 1101 and the touch pad 1102, the resonant sinusoidal wave MS would pass the user's body to transmit information. FIG. 11B illustrates a diagram depicting the contact conductor according to another preferred embodiment of the present invention. Referring to FIG. 11B, the contact conductor includes a coupling pad 1103 and a touch pad 1104. Similarly, the coupling pad 1103 is coupled to the resonant circuit. The difference between the touch pad in FIG. 11B and the touch pad in FIG. 11A is that the layout of the coupling pad 1101 and the touch pad 1102 in FIG. 11A is finger type layout. The layout of the coupling pad 1103 and the touch pad 1104 in FIG. 11B is that the touch pad 1104 encircles the coupling pad 1103. The principles of the FIG. 11A and FIG. 11B is the same. Thus, the detail description is omitted.

In summary, the spirit of the present invention adopts to output resonant sinusoidal wave to the pad. Thus, if there is at least one biological organism to serve as a media, the resonant sinusoidal wave would be transmitted through the skin of the biological organism. Also, in the embodiments, two different applications are provided such that user can exchange information, interact with people, perform game. Thus, the interactivity between people or between people and game device can be increased.

While certain exemplary embodiments have been described and shown in the accompanying drawings, it is to be understood that such embodiments are merely illustrative of and not restrictive on the broad invention, and that this invention should not be limited to the specific construction and arrangement shown and described, since various other modifications may occur to those ordinarily skilled in the art.

What is claimed is:

1. A biological contact interactive wearing system, comprising:
    a first bio-contact wearing device, comprising:
        a first fastener, for fastening the first bio-contact wearing device to a first user;
        a first contact conductor, wherein the first contact conductor contacts the first user when the first user wears the first bio-contact wearing device;
        a first signal transmitting circuit, coupled to the first contact conductor;
        a first storage device, coupled to the first signal transmitting circuit, for storing a transmitting message;
    a second bio-contact wearing device, comprising:
        a second fastener, for fastening the second bio-contact wearing device to a second user;
        a second contact conductor, wherein the second contact conductor contacts the second user when the second user wears the second bio-contact wearing device;
        a second signal receiving circuit, coupled to the second contact conductor;
        a second display device, coupled to the second signal receiving circuit;
    wherein, when the first user touches the second user, the first signal transmitting circuit modulates the transmitting message to a modulation signal, and transmits the modulation signal to the first contact conductor to transmit the modulation signal to the second conductor through a skin of the first user and a skin of the second user,
    wherein the second signal receiving circuit receives the modulation signal from the second contact conductor to perform a demodulation to obtain the transmitting message,
    wherein the second display displays the transmitting message when the second user operates the second bio-contact wearing device,
    wherein the first signal transmitting circuit comprises:
        a first resonant circuit, comprising a first terminal, a second terminal and a resonant terminal, wherein the resonant terminal of the first resonant circuit is coupled to the first contact conductor;
        a first pulse width modulation circuit, coupled to the first terminal of the first resonant circuit, for outputting a first pulse width modulation signal to the first terminal of the first resonant circuit; and
        a first control circuit, coupled to the first storage device and the first pulse width modulation circuit, for driving the first pulse width modulation circuit according to the transmitting message, to generate the first pulse width modulation signal.

2. The biological contact interactive wearing system according to claim 1, wherein the first resonant circuit comprises:
    a resonant inductor, comprising a first terminal and a second terminal, wherein the first terminal of the resonant inductor is coupled to the first terminal of the first resonant circuit; and a resonant capacitor, comprising a first terminal and a second terminal, wherein the first terminal of the resonant capacitor is coupled to the second terminal of the resonant inductor and the first contact conductor.

3. The biological contact interactive wearing system according to claim 2, wherein the first pulse width modulation circuit is a half bridge converter, and the half bridge converter comprises:
a first upper switch, comprising a first terminal, a second terminal and a control terminal, wherein the control terminal of the first upper switch is coupled to the first control circuit, the first terminal of the first upper switch is coupled to a power voltage, and the second terminal of the first upper switch is coupled to the first terminal of the resonant inductor; and
a first lower switch, comprising a first terminal, a second terminal and a control terminal, wherein the control terminal of the first lower switch is coupled to the first control circuit, the first terminal of the first lower switch is coupled to the first terminal of the resonant inductor, and the second terminal of the first lower switch is coupled to a common voltage,
wherein the second terminal of the resonant capacitor is coupled to the common voltage.

4. The biological contact interactive wearing system according to claim 2, wherein the first pulse width modulation circuit is a full bridge converter, and the full bridge converter comprises:
a first upper switch, comprising a first terminal, a second terminal and a control terminal, wherein the control terminal of the first upper switch is coupled to the first control circuit, the first terminal of the first upper switch is coupled to a power voltage, and the second terminal of the first upper switch is coupled to the first terminal of the resonant inductor;
a first lower switch, comprising a first terminal, a second terminal and a control terminal, wherein the control terminal of the first lower switch is coupled to the first control circuit, the first terminal of the first lower switch is coupled to the first terminal of the resonant inductor, and the second terminal of the first lower switch is coupled to a common voltage,
a second upper switch, comprising a first terminal, a second terminal and a control terminal, wherein the control terminal of the second upper switch is coupled to the first control circuit, the first terminal of the second upper switch is coupled to the power voltage, and the second terminal of the second upper switch is coupled to the second terminal of the resonant capacitor; and
a second lower switch, comprising a first terminal, a second terminal and a control terminal, wherein the control terminal of the second lower switch is coupled to the first control circuit, the first terminal of the second lower switch is coupled to the second terminal of the resonant capacitor, and the second terminal of the first lower switch is coupled to the common voltage.

5. The biological contact interactive wearing system according to claim 1, wherein a first logic of the transmitting message is transmitted by the first signal transmitting circuit,
the first control circuit controls the first pulse width modulation circuit to output pulses to the first resonant circuit for a preset period, afterward, to stop outputting the pulses for the preset period,
wherein a second logic of the transmitting message is transmitted by the first signal transmitting circuit, the first control circuit controls the first pulse width modulation circuit to stop outputting the pulses to the first resonant circuit for the preset period, afterward, to output the pulses for the preset period.

6. The biological contact interactive wearing system according to claim 1, wherein a first logic of the transmitting message is transmitted by the first signal transmitting circuit,
the first control circuit controls the first pulse width modulation circuit to output pulses to the first resonant circuit for a first preset period,
wherein a second logic of the transmitting message is transmitted by the first signal transmitting circuit,
the first control circuit controls the first pulse width modulation circuit to output the pulses to the first resonant circuit for a second preset period,
wherein the first preset period is not equal to the second preset period, and between an $I^{th}$ bit of the transmitting message and an $(I+1)^{th}$ bit of the transmitting message, the first control circuit controls the first pulse width modulation circuit to stop outputting pulses to the first resonant circuit for a third preset period,
wherein I is a natural number.

7. The biological contact interactive wearing system according to claim 1, wherein a first logic of the transmitting message is transmitted by the first signal transmitting circuit,
the first control circuit controls the first pulse width modulation circuit to output pulses to the first resonant circuit for a first preset period, afterward, to stop outputting the pulses for a second preset period,
wherein a second logic of the transmitting message is transmitted by the first signal transmitting circuit,
the first control circuit controls the first pulse width modulation circuit to output the pulses to the first resonant circuit for the first preset period, afterward, to stop outputting the pulses for a third preset period,
wherein the second preset period is not equal to the third preset period.

8. The biological contact interactive wearing system according to claim 1, wherein the second signal receiving circuit comprises:
a band pass filter, comprising an input terminal and an output terminal, wherein the input terminal of the band pass filter is coupled to the second contact conductor, wherein the band pass filter is used for performing a band pass filtering to the received modulation signal to obtain a band pass filtered signal;
an amplifying circuit, comprising an input terminal and an output terminal, wherein the input terminal of the amplifying circuit is coupled to the output terminal of the band pass filter, wherein the amplifying circuit is used for amplifying the band pass filtered signal to obtain an amplified signal;
an envelope detection circuit, comprising an input terminal and an output terminal, wherein the input terminal of the envelope detection circuit is coupled to the output terminal of the amplifying circuit, for detecting an envelope of the amplified signal, to obtain an envelope signal;
a comparator, comprising a first input terminal, a second input terminal and an output terminal, wherein the first input terminal of the comparator is coupled to the output terminal of the envelope detection circuit to receive the envelope signal, the second input terminal of the comparator receives a reference voltage, and the output terminal of the comparator is for outputting a demodulation signal; and a control circuit, coupled to the output terminal of the comparator, for converting the demodulation signal to the transmitting message.

9. The biological contact interactive wearing system according to claim 1, wherein the first contact conductor comprises a coupling pad and a touch pad, wherein the coupling pad is coupled to the first signal transmitting circuit for transmitting information through the skin of the first user.

10. A biological contact interactive amusement system, comprising:
   a first amusement device, comprising:
      a first control interface, comprising N options;
      a first signal transmitting circuit, coupled to the first control interface, wherein the first signal transmitting circuit outputs a $K^{th}$ signal when a $K^{th}$ option is selected;
      a first contact conductor, coupled to the first signal transmitting circuit, for receiving a signal outputted from the first signal transmitting circuit;
      a first signal receiving circuit, coupled to the first contact conductor;
   a second amusement device, comprising:
      a second control interface, comprising N options;
      a second signal transmitting circuit, coupled to the first control interface, wherein the first signal transmitting circuit outputs an $M^{th}$ signal when an $M^{th}$ option is selected;
      a second contact conductor, coupled to the second signal transmitting circuit, for receiving a signal outputted from the second signal transmitting circuit;
      a second signal receiving circuit, coupled to the second contact conductor;
   wherein, when an $I^{th}$ option of the first control interface is selected and a $J^{th}$ option of the second control interface is selected, and there is at least a biological organism between the first contact conductor and the second contact conductor, an $I^{th}$ signal outputted from the first control interface is transmitted to the second contact conductor, and a $J^{th}$ signal outputted from the second control interface is transmitted to the first contact conductor;
   wherein the first signal receiving circuit receives the $J^{th}$ signal to demodulate the $J^{th}$ signal to obtain a data of the $J^{th}$ option, and according to a preset rule, the data of the $J^{th}$ option and a data of the $I^{th}$ option, a result of a game of the first amusement device is determined, and the first amusement device outputs the result of the game of the first amusement device;
   wherein the second signal receiving circuit receives the $I^{th}$ signal to demodulate the $I^{th}$ signal to obtain the data of the $I^{th}$ option, and according to the preset rule, the data of the $J^{th}$ option and the data of the $I^{th}$ option, a result of the game of the second amusement device is determined, and the second amusement device outputs the result of the game of the second amusement device,
   wherein the first signal transmitting circuit comprises:
      a first resonant circuit, comprising a first terminal, a second terminal and a resonant terminal, wherein the resonant terminal of the first resonant circuit is coupled to the first contact conductor;
      a first pulse width modulation circuit, coupled to the first terminal of the first resonant circuit, for outputting a first pulse width modulation signal to the first terminal of the first resonant circuit; and
      a first control circuit, coupled to the first pulse width modulation circuit, for driving the first pulse width modulation circuit according to a transmitting message, to generate the first pulse width modulation signal,
   wherein N, M, I and J are natural numbers.

11. The biological contact interactive amusement system according to claim 10, wherein the first resonant circuit comprises:
   a resonant inductor, comprising a first terminal and a second terminal, wherein the first terminal of the resonant inductor is coupled to the first terminal of the first resonant circuit; and
   a resonant capacitor, comprising a first terminal and a second terminal, wherein the first terminal of the resonant capacitor is coupled to the second terminal of the resonant inductor and the first contact conductor.

12. The biological contact interactive amusement system according to claim 11, wherein the first pulse width modulation circuit is a half bridge converter, and the half bridge converter comprises:
   a first upper switch, comprising a first terminal, a second terminal and a control terminal, wherein the control terminal of the first upper switch is coupled to the first control circuit, the first terminal of the first upper switch is coupled to a power voltage, and the second terminal of the first upper switch is coupled to the first terminal of the resonant inductor; and
   a first lower switch, comprising a first terminal, a second terminal and a control terminal, wherein the control terminal of the first lower switch is coupled to the first control circuit, the first terminal of the first lower switch is coupled to the first terminal of the resonant inductor, and the second terminal of the first lower switch is coupled to a common voltage,
   wherein the second terminal of the resonant capacitor is coupled to the common voltage.

13. The biological contact interactive amusement system according to claim 11, wherein the first pulse width modulation circuit is a full bridge converter, and the full bridge converter comprises:
   a first upper switch, comprising a first terminal, a second terminal and a control terminal, wherein the control terminal of the first upper switch is coupled to the first control circuit, the first terminal of the first upper switch is coupled to a power voltage, and the second terminal of the first upper switch is coupled to the first terminal of the resonant inductor;
   a first lower switch, comprising a first terminal, a second terminal and a control terminal, wherein the control terminal of the first lower switch is coupled to the first control circuit, the first terminal of the first lower switch is coupled to the first terminal of the resonant inductor, and the second terminal of the first lower switch is coupled to a common voltage,
   a second upper switch, comprising a first terminal, a second terminal and a control terminal, wherein the control terminal of the second upper switch is coupled to the first control circuit, the first terminal of the second upper switch is coupled to the power voltage, and the second terminal of the second upper switch is coupled to the second terminal of the resonant capacitor; and
   a second lower switch, comprising a first terminal, a second terminal and a control terminal, wherein the control terminal of the second lower switch is coupled to the first control circuit, the first terminal of the second lower switch is coupled to the second terminal of the resonant capacitor, and the second terminal of the first lower switch is coupled to the common voltage.

14. The biological contact interactive amusement system according to claim 10, wherein a first logic of a data of the selected option of the first control interface is transmitted by the first signal transmitting circuit,
the first control circuit controls the first pulse width modulation circuit to output pulses to the first resonant circuit for a preset period, afterward, to stop outputting the pulses for the preset period,
wherein a second logic of the data of the selected option of the first control interface is transmitted by the first signal transmitting circuit,
the first control circuit controls the first pulse width modulation circuit to stop outputting the pulses to the first resonant circuit for the preset period, afterward, to output the pulses for the preset period.

15. The biological contact interactive amusement system according to claim 10, wherein a first logic of a data of the selected option of the first control interface is transmitted by the first signal transmitting circuit,
the first control circuit controls the first pulse width modulation circuit to output pulses to the first resonant circuit for a first preset period,
wherein a second logic of the data of the selected option of the first control interface is transmitted by the first signal transmitting circuit,
the first control circuit controls the first pulse width modulation circuit to output pulses to the first resonant circuit for a second preset period,
wherein the first preset period is not equal to the second preset period, and between an $I^{th}$ bit of the data of the selected option of the first control interface and an $(I+1)^{th}$ bit of the data of the selected option of the first control interface, the first control circuit controls the first pulse width modulation circuit to stop outputting pulses to the first resonant circuit for a third preset period,
wherein I is a natural number.

16. The biological contact interactive amusement system according to claim 10, wherein a first logic of a data of the selected option of the first control interface is transmitted by the first signal transmitting circuit,
the first control circuit controls the first pulse width modulation circuit to output pulses to the first resonant circuit for a first preset period, afterward, to stop outputting the pulses for a second preset period,
wherein a second logic of a data of the selected option of the first control interface is transmitted by the first signal transmitting circuit,
the first control circuit controls the first pulse width modulation circuit to output the pulses to the first resonant circuit for the first preset period, afterward, to stop outputting the pulses for a third preset period,
wherein the second preset period is not equal to the third preset period.

17. The biological contact interactive amusement system according to claim 10, wherein the second signal receiving circuit comprises:
a band pass filter, comprising an input terminal and an output terminal, wherein the input terminal of the band pass filter is coupled to the second contact conductor, wherein the band pass filter is used for performing a band pass filtering to a received signal of the input terminal thereof to obtain a band pass filtered signal;
an amplifying circuit, comprising an input terminal and an output terminal, wherein the input terminal of the amplifying circuit is coupled to the output terminal of the band pass filter, wherein the amplifying circuit is used for amplifying the band pass filtered signal to obtain an amplified signal;
an envelope detection circuit, comprising an input terminal and an output terminal, wherein the input terminal of the envelope detection circuit is coupled to the output terminal of the amplifying circuit, for detecting an envelope of the amplified signal, to obtain an envelope signal;
a comparator, comprising a first input terminal, a second input terminal and an output terminal, wherein the first input terminal of the comparator is coupled to the output terminal of the envelope detection circuit to receive the envelope signal, the second input terminal of the comparator receives a reference voltage, and the output terminal of the comparator is for outputting a demodulation signal; and
a control circuit, coupled to the output terminal of the comparator, for converting the demodulation signal to a data code.

18. The biological contact interactive wearing system according to claim 10, wherein the first contact conductor comprises a coupling pad and a touch pad, wherein the coupling pad is coupled to the first signal transmitting circuit for transmitting information through a skin of a first user.

19. A data transmission circuit for biological contact, comprising:
a contact conductor;
a resonant circuit, comprising a first terminal, a second terminal and a resonant terminal, wherein the resonant terminal is coupled to the contact conductor;
a pulse width modulation circuit, coupled to the first terminal of the resonant circuit, for outputting a pulse width modulation signal to the first terminal of the resonant circuit; and
a control circuit, coupled to the pulse width modulation circuit, for driving the pulse width modulation circuit to generate the pulse width modulation signal;
wherein, when the data transmission circuit for biological contact performs data transmission, the control circuit controls the pulse width modulation circuit to output the pulse width modulation signal to the resonant circuit such that the resonant circuit generates a resonant sinusoidal wave to the contact conductor, and the control circuit controls an output period and its time interval of the resonant sinusoidal wave according to a logic of a data to be transmitted,
wherein, when a biological organism contacts the contact conductor, the resonant sinusoidal wave is transmitted to an external signal receiving circuit through a skin of the biological organism, the external signal receiving circuit determines a logic of a transmitted data according to an envelope of the resonant sinusoidal wave.

20. The data transmission circuit for biological contact according to claim 19, wherein the resonant circuit comprises:
a resonant inductor, comprising a first terminal and a second terminal, wherein the first terminal of the resonant inductor is coupled to the first terminal of the resonant circuit; and
a resonant capacitor, comprising a first terminal and a second terminal, wherein the first terminal of the resonant capacitor is coupled to the second terminal of the resonant inductor and the contact conductor.

21. The data transmission circuit for biological contact according to claim 20, wherein the pulse width modulation circuit is a half bridge converter, and the half bridge converter comprises:
- a first upper switch, comprising a first terminal, a second terminal and a control terminal, wherein the control terminal of the first upper switch is coupled to the control circuit, the first terminal of the first upper switch is coupled to a power voltage, and the second terminal of the first upper switch is coupled to the first terminal of the resonant inductor; and
- a first lower switch, comprising a first terminal, a second terminal and a control terminal, wherein the control terminal of the first lower switch is coupled to the control circuit, the first terminal of the first lower switch is coupled to the first terminal of the resonant inductor, and the second terminal of the first lower switch is coupled to a common voltage,
- wherein the second terminal of the resonant capacitor is coupled to the common voltage.

22. The data transmission circuit for biological contact according to claim 20, wherein the pulse width modulation circuit is a full bridge converter, and the full bridge converter comprises:
- a first upper switch, comprising a first terminal, a second terminal and a control terminal, wherein the control terminal of the first upper switch is coupled to the control circuit, the first terminal of the first upper switch is coupled to a power voltage, and the second terminal of the first upper switch is coupled to the first terminal of the resonant inductor;
- a first lower switch, comprising a first terminal, a second terminal and a control terminal, wherein the control terminal of the first lower switch is coupled to the control circuit, the first terminal of the first lower switch is coupled to the first terminal of the resonant inductor, and the second terminal of the first lower switch is coupled to a common voltage,
- a second upper switch, comprising a first terminal, a second terminal and a control terminal, wherein the control terminal of the second upper switch is coupled to the control circuit, the first terminal of the second upper switch is coupled to the power voltage, and the second terminal of the second upper switch is coupled to the second terminal of the resonant capacitor; and
- a second lower switch, comprising a first terminal, a second terminal and a control terminal, wherein the control terminal of the second lower switch is coupled to the control circuit, the first terminal of the second lower switch is coupled to the second terminal of the resonant capacitor, and the second terminal of the first lower switch is coupled to the common voltage.

23. The data transmission circuit for biological contact according to claim 19, wherein, when a logic of the data to be transmitted is a first logic,
the control circuit controls the pulse width modulation circuit to output pulses to the resonant circuit for a preset period, afterward, to stop outputting the pulses for the preset period,
wherein, when the logic of the data to be transmitted is a second logic,
the control circuit controls the pulse width modulation circuit to stop outputting the pulses to the resonant circuit for the preset period, afterward, to output the pulses for the preset period.

24. The data transmission circuit for biological contact according to claim 19, wherein, when a logic of the data to be transmitted is a first logic,
the control circuit controls the pulse width modulation circuit to output pulses to the resonant circuit for a first preset period,
wherein, when the logic of the data to be transmitted is a second logic,
the control circuit controls the pulse width modulation circuit to output pulses to the resonant circuit for a second preset period,
wherein the first preset period is not equal to the second preset period, and between an $I^{th}$ bit of the data to be transmitted and an $(I+1)^{th}$ bit of the data to be transmitted, the control circuit controls the pulse width modulation circuit to stop outputting pulses to the resonant circuit for a third preset period,
wherein I is a natural number.

25. The data transmission circuit for biological contact according to claim 19, wherein, when a logic of the data to be transmitted is a first logic,
the control circuit controls the pulse width modulation circuit to output pulses to the resonant circuit for a first preset period, afterward, to stop outputting the pulses for a second preset period,
wherein, when a logic of the data to be transmitted is a second logic,
the control circuit controls the pulse width modulation circuit to output the pulses to the resonant circuit for the first preset period, afterward, to stop outputting the pulses for a third preset period,
wherein the second preset period is not equal to the third preset period.

26. The data transmission circuit for biological contact according to claim 19, wherein the data transmission circuit further comprises a signal receiving circuit, wherein the signal receiving circuit comprises:
- a band pass filter, comprising an input terminal and an output terminal, wherein the input terminal of the band pass filter is coupled to the resonant circuit, wherein the band pass filter is used for performing a band pass filtering to a received modulation signal to obtain a band pass filtered signal;
- an amplifying circuit, comprising an input terminal and an output terminal, wherein the input terminal of the amplifying circuit is coupled to the output terminal of the band pass filter, wherein the amplifying circuit is used for amplifying the band pass filtered signal to obtain an amplified signal;
- an envelope detection circuit, comprising an input terminal and an output terminal, wherein the input terminal of the envelope detection circuit is coupled to the output terminal of the amplifying circuit, for detecting an envelope of the amplified signal, to obtain an envelope signal;
- a comparator, comprising a first input terminal, a second input terminal and an output terminal, wherein the first input terminal of the comparator is coupled to the output terminal of the envelope detection circuit to receive the envelope signal, the second input terminal of the comparator receives a reference voltage, and the output terminal of the comparator is for outputting a demodulation signal; and
- wherein the control circuit is coupled to the output terminal of the comparator, for converting the demodulation signal to the data.

27. The data transmission circuit for biological contact according to claim 19, wherein the contact conductor comprises a coupling pad and a touch pad, wherein the coupling pad is coupled to the resonant circuit for transmitting information through the skin of the biological organism.

\* \* \* \* \*